United States Patent Office 3,553,255
Patented Jan. 5, 1971

3,553,255
NOVEL WATER SOLUBLE POLYMER
Nelson S. Marans, Silver Spring, Md., assignor to W. R. Grace & Co., New York, N.Y., a corporation of Connecticut
No Drawing. Filed Oct. 10, 1968, Ser. No. 766,624
Int. Cl. C07c *103/50*
U.S. Cl. 260—482
10 Claims

ABSTRACT OF THE DISCLOSURE

In abstract this invention is directed to a process for preparing a water soluble polymer comprising heating at about 125–250° C. a reaction mixture consisting essentially of an inert liquid medium boiling at about 120–260° C. at about 760 millimeters of mercury absolute pressure, N-(acetamide)-iminodiacetic acid and a member selected from a group consisting of diols having the formula HO—G—OH, amino alcohols having the formula HO—G—NH$_2$, and diamines having the formula

H$_2$N—G—NH$_2$ wherein G is an alkylene group having 2–6 carbon atoms. The mole ratio of the N-(acetamide)-iminodiacetic acid to the group member being about 1:08–1.2, to form the water soluble polymer and water while removing the water substantially as it is formed, separating and recovering the polymer, all as recited hereinafter.

BACKGROUND OF THE INVENTION

This invention is in the field of water soluble polymers and the preparation thereof. The invention is directed to novel water soluble polymers prepared by reacting N-(acetamide)-iminodiacetic acid (an acid having the formula

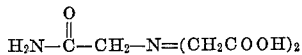

and a member selected from a group consisting of diols having the formula HO—G—OH, amino alcohols having the formula HO—G—NH$_2$, and diamines having the formula H$_2$N—G—NH$_2$, wherein G is an alkylene (divalent alkyl group) having 2–12 carbon atoms in an inert liquid medium in which said polymers are substantially insoluble and to the process for preparing such polymers.

SUMMARY OF THE INVENTION

In summary this invention is directed to a method for preparing a water soluble polymer, excellently adapted for use as a reagent for preventing the formation of scale in boilers, comprising:
(a) Heating at about 125–250° C. a reaction mixture consisting essentially of an inert liquid medium boiling at about 120–260° C. at about 760 millimeters of mercury absolute pressure, N-(acetamide)-iminodiacetic acid and a member selected from a group consisting of diols having the formula HO—G—OH, amino alcohols having the formula HO—G—NH$_2$, and diamines having the formula H$_2$N—G—NH$_2$, wherein G is an alkylene group having about 2–12 carbon atoms, the mole ratio of the N-(acetamide)-iminodiacetic acid to the group member being about 1:08–1.2, to form the water soluble polymer and water, the water being removed substantially at it is formed;
(b) Separating the water soluble polymer from the inert medium; and
(c) Recovering the separated polymer.

DESCRIPTION OF PREFERRED EMBODIMENTS

In preferred embodiments of the process described in the above summary:
(1) G is an alkylene group having 2 carbon atoms;
(2) The mole ratio of N-(acetamide)-iminodiacetic acid to the group member is about 1:0.95–1.05 (and about 1:0.98–1.02 for optimum results);
(3) The separated polymer is dried until substantially free of inert medium before being recovered;
(4) G is an alkylene group having 6 carbon atoms; and
(5) The heating time is about 10–600 minutes.

In another preferred embodiment (Embodiment A) this invention is directed to a water soluble polymer excellently adapted for use as a reagent for preventing the formation of scale in the boilers, prepared by a process, comprising:
(a) Heating at about 125–250° C. a reaction mixture consisting essentially of an inert liquid medium in which the polymer is substantially insoluble, the medium boiling at about 120–260° C. at about 760 millimeters of mercury absolute pressure, N-(acetamide)-iminodiacetic acid and a member selected from a group consisting of diols having the formula HO—G—OH, amino alcohols having the formula HO—G—NH$_2$, and diamines having the formula H$_2$N—G—NH$_2$, wherein G is an alkylene group having about 2–12 carbon atoms, the mole ratio of the N-(acetamide)-iminodiacetic acid to the group member being about 1:0.8–1.2, to form the water soluble polymer and water, the water being removed substantially as it is formed;
(b) Separating the water soluble polymer from the inert medium; and
(c) Recovering the separated polymer.

In preferred embodiments of the polymer described in Embodiment A, supra:
(1) G is an alkylene group having 2 carbon atoms;
(2) The mole ratio of N-(acetamide)-iminodiacetic acid to the group member is about 1:0.95–1.05 (and about 1:0.98–1.02 for optimum results);
(3) The separated polymer is dried until substantially free of inert medium before being recovered;
(4) G is an alkylene group having 6 carbon atoms; and
(5) The heating time is about 10–600 minutes.

DETAILED DESCRIPTION OF THE INVENTION

As stated supra the polymers of this invention are prepared by reacting in an inert liquid medium (or inert solvent) boiling at about 120–260° C. at 760 millimeters (mm.) of mercury absolute pressure a reacting mixture consisting essentially of (a) N-(acetamide)-iminodiacetic acid (an acid having the formula

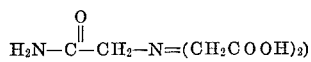

and (b) a member selected from the group consisting of diols having the formula HO—G—OH, amino alcohols having the formula HO—G—NH$_2$, and diamines having the formula H$_2$N—G—NH$_2$, wherein G is an alkylene (divalent alkyl) group having 2–12 carbon atoms (preferably 2–6 carbon atoms) to form water and the desired polymer.

Water is removed from the reactive mixture continuously and substantially as it (the water) is formed. A preferred method for removing the water comprises using as an inert liquid medium an inert solvent such as xylene, ethylbenzene, or the like in which water is substantially insoluble and refluxing the mixture of inert solvent and reacting mixture while condensing the vapors and collecting the resulting condensate in a water separating trap (e.g., a Dean-Stark trap, a Barrett trap, or the like), wherein the water is separated from the inert solvent, and returning the substantially water-free inert solvent to the refluxing reacting mixture.

Other methods for removing water substantially as it is formed will be readily apparent to those skilled in the art. One such method comprises continuously withdrawing a slip, or side, stream of liquid from the heated (e.g., refluxing) mixture, separating (e.g., by decantation, filtration, or centrifugation) any precipitated or insoluble polymer from the slip stream—returning such separated polymer to the heated or refluxing mixture—and contacting the slip stream with a dessicant or a water absorbing material (preferably after cooling the slip stream) such as silica gel or alumina gel to remove water from the inert solvent component of the slip stream and returning the thus contacted and now substantially water-free liquid to the reacting mixture.

When the reaction is completed or substantially completed (as determined by any convenient means, e.g., by elimination (separation) of the theoretical quantity of water or by analysis of a sample of the reacting mixture), the thus formed polymer can be separated from the liquid medium by decantation, filtration, or centrifugation—the polymer being insoluble in the inert liquid medium, or by distilling or vaporizing the medium from said polymer and more preferably by conducting the distillation under reduced pressure, the thus separated water soluble polymer can be removed, or it can be dried (i.e., substantially freed of inert medium and then recovered).

The resulting water soluble polymers are excellent materials for chelating metal ions especially calcium and magnesium, ions. These polymers are especially useful for treating water. For example, where added to boiler water, either as made according to the process of this invention or with hydrolysis of pendent amide groups to carboxylate groups, the polymers of this invention prevent scale formation in boilers. In particular, polymers made according to the process of this invention from ethylene glycol, monoethanolamine (ethanolamine), and ethylenediamine are very soluble in water and can be used over a wide range of concentrations for the treatment of water (e.g., water for use in boilers).

The instant invention is further illustrated by the following non-limiting examples—said examples being provided to illustrate but not to limit the invention.

EXAMPLE I

A reaction mixture of 20.3 grams (g.) of N-acetamide)-iminodiacetic acid

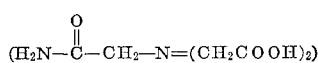

12.7 g. of 1,6-diaminohexane

and 100 milliliters (ml.) of xylene was heated in a round bottom flask at about 145° C. for about 135 minutes while stirring the heated mixture. A reflux condenser and Dean Stark trap were attached to the flask to condense and collect vapor formed by the heating. A water phase and a xylene phase separated in the trap in the well known manner. The resulting substantially water-free xylene phase was recycled to the round bottom flask.

A xylene insoluble residue (the desired polymer) formed and, when the heat source was removed, settled to the bottom of the flask. This polymer was separated from the xylene (by filtration) and dried at about 60° C. and 250 mm. of mercury absolute pressure until substantially free of xylene. The dried polymer was recovered. It was a yellow-tan solid weighing 27.6 g. It was readily soluble in water—1 g. dissolving in about 100 ml. of water at 60° C.

The separated xylene was found by distillation to contain a small quantity (ca. 0.3 g.) of 1,6-diaminohexane.

The recovered polymer was found to be an excellent material for chelating metallic ions—especially calcium and magnesium ions.

When added to hard water (water containing about 0.1 g. per liter of ions selected from the group consisting of calcium and magnesium), at a rate of about 0.1 g. of polymer per liter of water, substantially no scale or precipitate formed when the thus treated water was boiled under reflux for about 48 hours.

A substantial quantity of scale (or scale-like material) precipitated when a portion of the same water but without the addition of the polymer of this invention was similarly boiled for about 48 hours.

EXAMPLE II

The general procedure of Example I was repeated, but in this instance the reaction mixture was heated at 145° C. for about 10 hours.

The recovered polymer was treated with water (using 50 ml. of water at 60° C. per g. of polymer). A small portion (about 20%) of the polymer did not dissolve in the water although a major portion of the polymer did dissolve. The portion of polymer which did not dissolve in water swelled when immersed in hot (ca. 80–95° C.) for about 10 minutes, thereby to show the presence of crosslinking in the water insoluble portion.

The water soluble portion of the polymer was an excellent material for preventing the formation of scale in boilers.

EXAMPLE III

The general procedure of Example I was repeated. However, in this instance, the reaction mixture was prepared by mixing 20.4 g. N-(acetamide)-iminodiactic acid, 6.7 g. of ethylenediamine, and 100 ml. of xylene. A layer of xylene insoluble polymer began to form within a few minutes after the reacting system was brought to about 145° C.

After about 2 hours, heating was discontinued, the xylene was decanted from the polymer which was dried at about 60° C. and 250 mm. of mercury absolute pressure until substantially free of xylene. The very hygroscopic product weighed 23.1 g. it was completely soluble in water—1 g. dissolving in about 20 ml. of water at 60° C.

The thus formed and recovered water soluble polymer was an excellent material for preventing the formation of scale in boilers.

EXAMPLE IV

The general procedure of Example II was repeated, but, in this instance the reactants and the proportions of the respective reactants were those of Example III. The results were substantially as reported in Example II.

EXAMPLE V

The general procedure of Example I was repeated; however, in this instance the reaction mixture was prepared by adding 20.3 g. of N-(acetamide)-iminodiacetic acid, 7.0 g. of monoethanolamine, and 100 ml. of xylene to a round bottom flask. The mixture was heated for about 160 minutes at about 145° C. A liquid material—insoluble in xylene and heavier than xylene—formed after the mixture had been heated for about 10–15 minutes. After heating for about 160 minutes the xylene insoluble material was separated from the xylene (using a separatory funnel). The separated liquid was dried at about 60° C. and 250 mm. of mercury for 7 hours during which time it became a solid. The substantially dry solid was recovered and weighed 23.6 g. and was readily soluble in water—1 g. dissolving in about 20 ml. of water at 80° C.

The water soluble polymer was found to be an excellent material for preventing the formation of scale in boilers.

EXAMPLE VI

The general procedure of Example I was repeated. However, in this instance the reaction mixture was prepared by mixing 19.8 g. of N-(acetamide)-iminodiacetonitrile, 6.8 g. of ethylene glycol, and 100 ml. of xylene. The mixture was heated at about 145° C. for 80 minutes.

The mixture was cooled, and the xylene insoluble polymer therein was separated by filtration. The polymer was dried (substantially freed of xylene) by heating at about 60° C. and 250 mm. of mercury for about 12 hours.

The recovered polymer, which weighed 22.6 g. was readily soluble in water—1 g. of polymer dissolving in about 20 ml. of water at 60° C.

The polymer was found to be an excellent material for preventing the formation of scale in boilers.

I have also found that in another embodiment of this invention the polymers of said invention can be formed by heating N-(acetamide)-iminodiacetic acid and a member selected from the group consisting of diols having the formula HO—G—OH, diamines having the formula $H_2N$—G—$NH_2$, and amino alcohols having the formula HO—G—$NH_2$, wherein G is an alkylene group having 2-6 carbon atoms, to about 160-250° C. for about 10-600 minutes in the absence or substantial absence of an inert liquid medium of the type discussed supra. Water is vaporized from the solvent (inert liquid medium) free system substantially as it (the water) is formed.

As used herein, the term "percent (%)" means parts per hundred by weight unless otherwise defined where used, and the term "parts," unless otherwise defined where used, means parts by weight.

Inert liquid media which are operable in the process of this invention include but are not limited to xylene, ethylbenzene, propylbenzene, chlorobenzene, 1,2,3,4-tetrahydronaphthalene, tetramethylbenzene, butylbenzene, octyl chloride, decyl chloride, and 4-methylbenzyl chloride. Still other inert media will be readily apparent to those skilled in the art.

Dihydric alcohols (alkylene diols) which are operable in the process of this invention include, but are not limited to; (a) ethylene glycol, the propylene glycols, the butylene glycols, the pentane diols, and the hexane diols; (b) HO—$CH_2(CH_2)_nCH_2$—OH, wherein $n$ is about 5-10 and the isomers thereof including

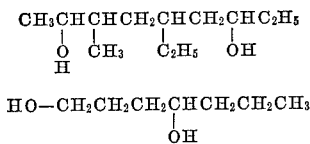

and

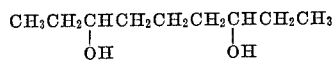

Amino alcohols which are operable in the process of this invention include, but are not limited to; (a) monoethanolamine, the monopropanolamines, the monobutanolamines, the monopentanolamines, the monooctanolamine; and (b) HO—$CH_2(CH_2)_nCH_2$—$NH_2$ where $n$ is about 7-10 and the isomers thereof.

Diamines which are operable in the process of this invention include, but are not limited to; (a) ethylenediamine, the propylenediamines, the butylenediamines, the diaminopentanes, the diaminohexanes, the diaminoheptanes, the diaminooctanes; and (b)

$H_2N$—$CH_2(CH_2)_nCH_2$—$NH_2$ where $n$ is about 7-10 and the isomers thereof.

I claim:
1. A process for preparing a water soluble polymer, comprising:
   (a) heating at about 125-250° C. a reaction mixture consisting essentially of inert liquid medium in which the polymer is substantially insoluble, the medium boiling at about 120-260° C. at about 760 millimeters of mercury absolute pressure, N-(acetamide)-iminodiacetic acid and a member selected from a group consisting of diols having the formula HO—G—OH, amino alcohols having the formula HO—G—$NH_2$, the diamines having the formula $H_2N$—G—$NH_2$, wherein G is an alkylene group having about 2-12 carbon atoms, the mole ratio of the N-(acetamide)-iminodiacetic acid to the group member being about 1:0.8-1.2, to form water soluble polymer and water, the water being removed substantially as it is formed;
   (b) separating the water soluble polymer from the inert medium; and
   (c) recovering the separated polymer.
2. The process of claim 1 in which G is an alkylene group having 2 carbon atoms.
3. The process of claim 1 in which mole ratio of N-(acetamide)-iminodiacetic acid to the group member is about 1:0.95-1.05.
4. The process of claim 1 in which the separated polymer is dried until substantially free of inert medium before being recovered.
5. The process of claim 1 in which G is an alkylene group having 6 carbon atoms.
6. A water soluble polymer prepared by a process, comprising:
   (a) heating at about 125-250° C. a reaction mixture consisting essentially of inert liquid medium in which the polymer is substantially insoluble, the medium boiling at about 120-260° C. at about 760 millimeters of mercury absolute pressure, N-(acetamide)-iminodiacetic acid and a member selected from a group consisting of diols having the formula HO—G—OH, amino alcohols having the formula HO—G—$NH_2$, and diamines having the formula $H_2N$—G—$NH_2$, wherein G is an alkylene group having about 2-12 carbon atoms, the mole ratio of the N-(acetamide)-iminodiacetic acid to the group member being about 1:0.8-1.2, to form the water soluble polymer and water, the water being removed substantially as it is formed;
   (b) separating the water soluble polymer from the inert medium; and
   (c) recovering the separated polymer.
7. The polymer of claim 6 in which G is an alkylene group having 2 carbon atoms.
8. The polymer of claim 6 in which mole ratio of N-(acetamide)-iminodiacetic acid to the group member is about 1:0.95-1.05.
9. The polymer of claim 6 in which the separated polymer is dried until substantially free of inert medium before being recovered.
10. The polymer of claim 6 in which G is an alkylene group having 6 carbon atoms.

References Cited
UNITED STATES PATENTS 2,842,523   7/1958   Tousignant ---------- 260—69

LORRAINE A. WEINBERGER, Primary Examiner

P. J. KILLOS, Assistant Examiner

U.S. Cl. X.R.

260—78, 561